United States Patent
Sheldon

[11] Patent Number: 6,108,914
[45] Date of Patent: Aug. 29, 2000

[54] FIXED LINE TRIMMER HEAD

[75] Inventor: John D. Sheldon, Chandler, Ariz.

[73] Assignee: Ryobi North America, Inc., Anderson, S.C.

[21] Appl. No.: 09/129,193

[22] Filed: Jul. 24, 1998

Related U.S. Application Data

[60] Provisional application No. 60/053,855, Jul. 25, 1997.

[51] Int. Cl.[7] .................................................. A01D 34/84
[52] U.S. Cl. ................................................ 30/276; 30/347
[58] Field of Search ........................ 30/276, 347; 56/12.7

[56] References Cited

U.S. PATENT DOCUMENTS

| | | |
|---|---|---|
| 3,900,071 | 8/1975 | Crawford . |
| 4,043,037 | 8/1977 | Okamoto et al. . |
| 4,054,992 | 10/1977 | Ballas et al. . |
| 4,068,376 | 1/1978 | Briar . |
| 4,086,700 | 5/1978 | Inada . |
| 4,089,114 | 5/1978 | Doolittle et al. . |
| 4,107,841 | 8/1978 | Rebhun . |
| 4,118,865 | 10/1978 | Jacyno et al. . |
| 4,190,954 | 3/1980 | Walto ........................................ 30/347 |
| 4,268,964 | 5/1981 | Moore . |
| 4,571,831 | 2/1986 | White, III . |
| 4,685,279 | 8/1987 | Gullett . |
| 4,756,146 | 7/1988 | Rouse . |
| 5,433,006 | 7/1995 | Taguchi .................................... 30/276 |
| 5,836,227 | 11/1998 | Dees, Jr. et al. . |

*Primary Examiner*—Douglas D. Watts
*Attorney, Agent, or Firm*—Brooks & Kushman P.C.

[57] ABSTRACT

A line trimmer head assembly having a central hub and a body including an annular disc extending circumferentially radially outward from the central hub to removably receive the length of a uniform cross-section line. The disc member is provided with a pair of openings on the disc periphery through which a fixed line length is threaded. The interior portion of the disc is provided with at least two retainer clips having a hook shaped member with an incline ramp surface for cooperating with the portion of the line extending between the two openings. The line is held in place by tension which causes the line to travel down the ramp surface.

20 Claims, 3 Drawing Sheets

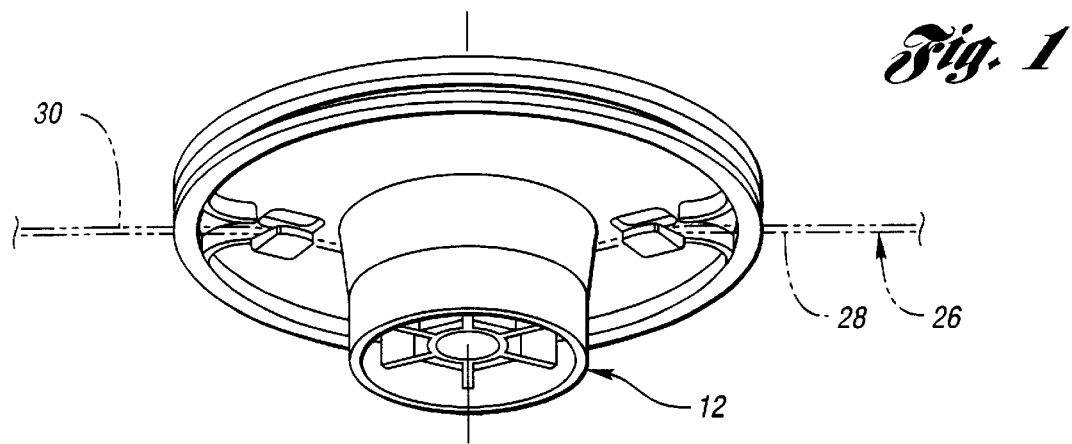
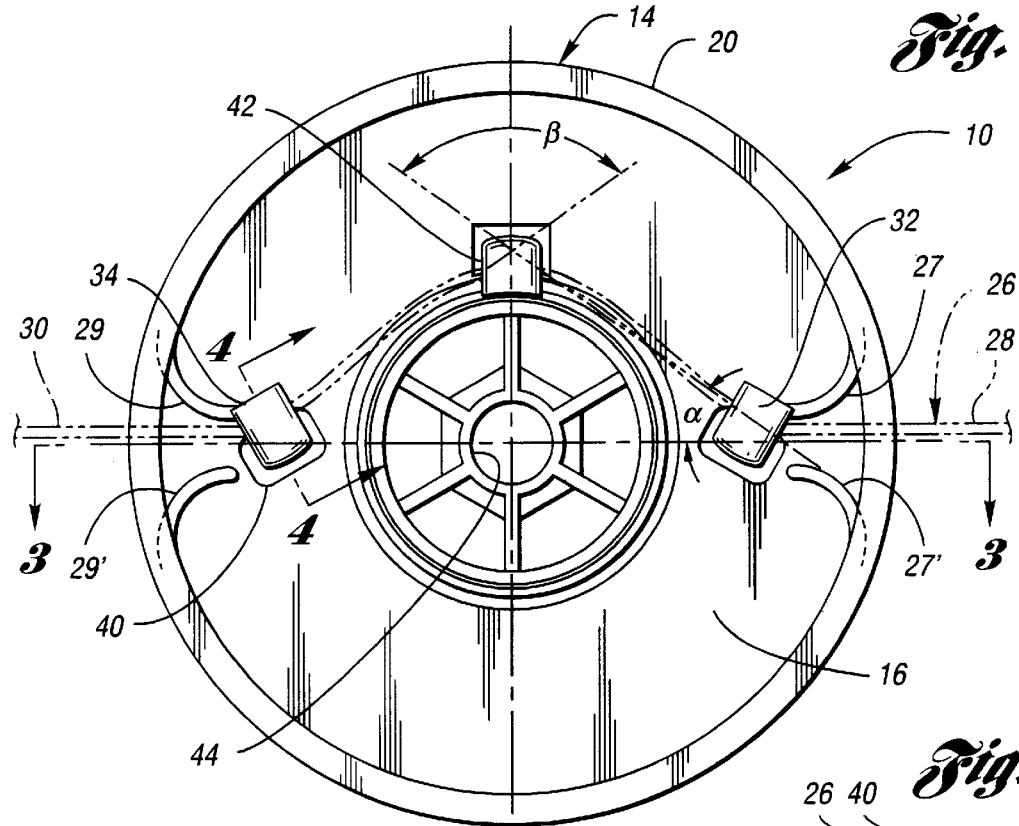
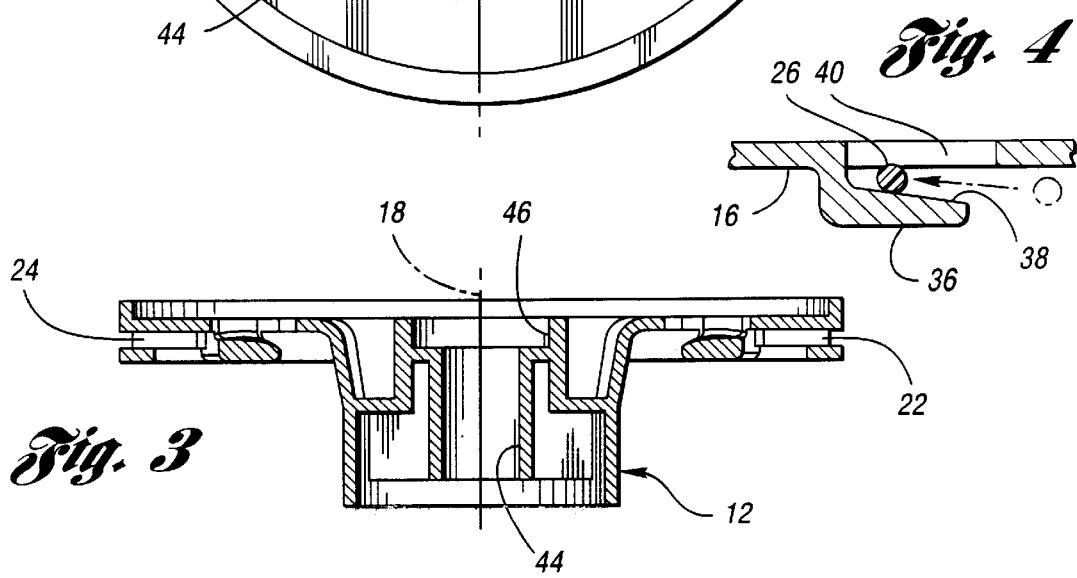

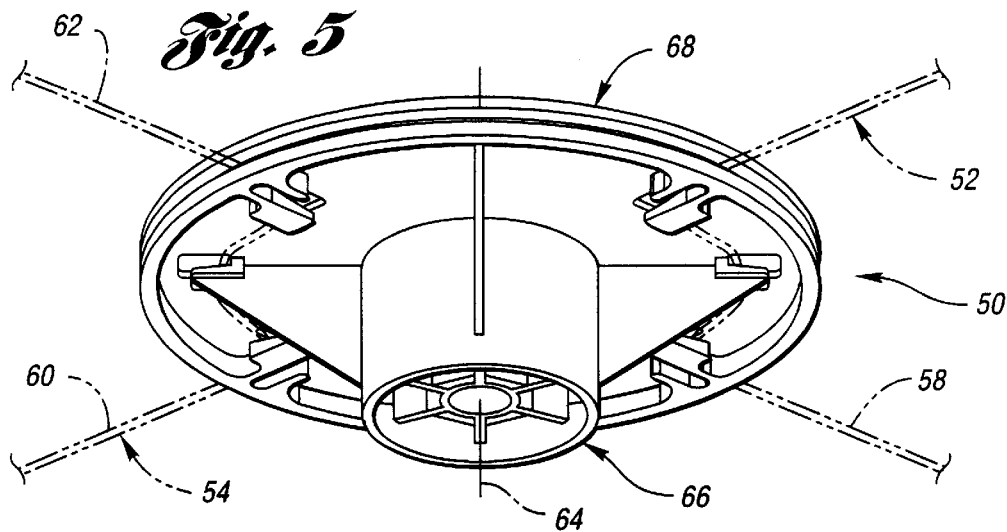
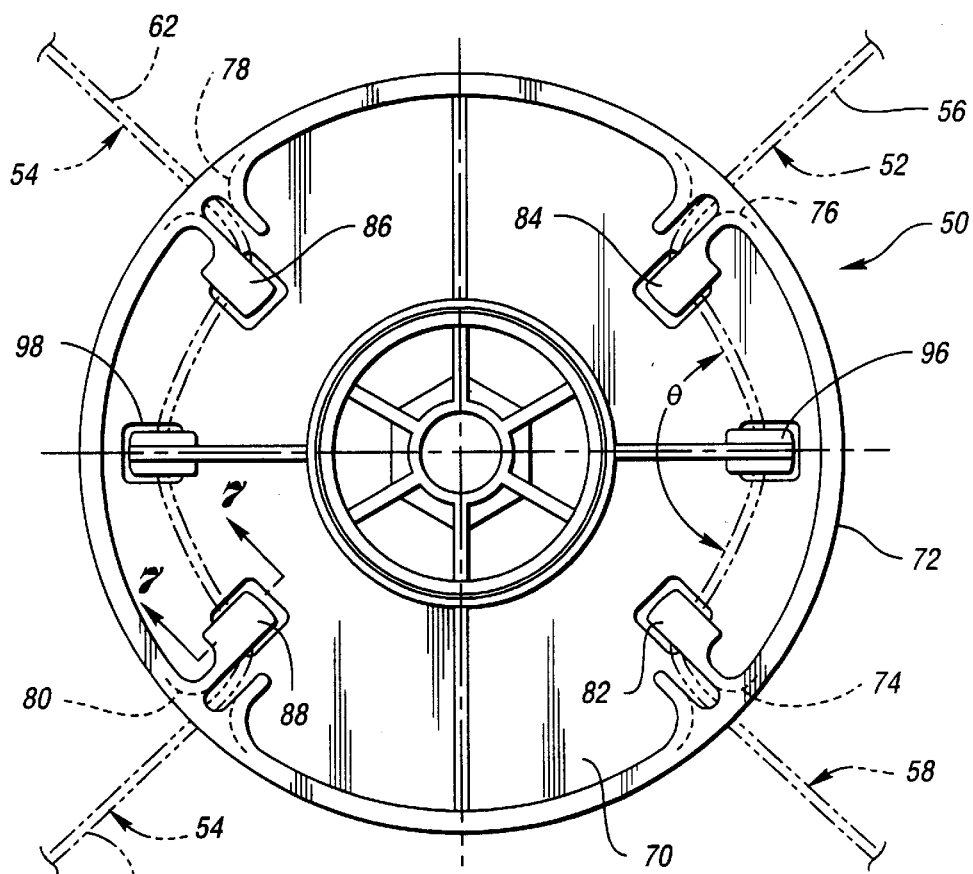
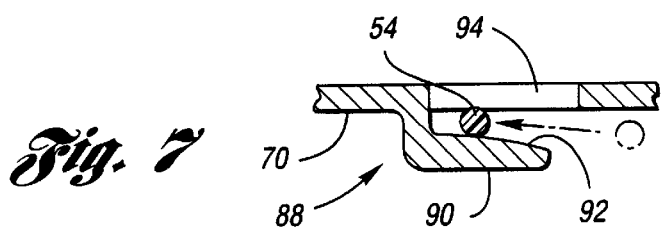

6,108,914

FIXED LINE TRIMMER HEAD

CROSS REFERENCE TO RELATED CASES

This application claims the benefit of provisional application Ser. No. 60/053,855 filed Jul. 25, 1997.

BACKGROUND

Rotary line trimmers are in wide-spread use for trimming grass and other vegetation in areas not accessible by conventional lawn mowers. The line trimmers have a rotary head powered by a gasoline engine or an electric motor mounted on the end of an elongated boom. The rotary line trimmer head is typically mounted to a drive spindle which is pivotally mounted on the end of an elongated boom. Extending generally radially outward from the periphery of the line trimmer head, are one or more segments of line typically a 0.05 to 0.10 inch diameter monofilament line.

In use, when cutting portion of the line is damaged, it becomes necessary to replace the line. A number of varying mechanisms to achieve line replacement have been developed over the years. The most common technique is to include a spool of line within the head and incrementally advance the line extending a new segment to replace the damaged segment. This type of trimmer is typically the bump head variety in which the line incrementally advances in response to the trimmer head being bumped on the ground. There also exists trimmer head of the automatic variety in which the line incrementally advances in response to a significant change in rotational speed of the trimmer head, i.educing the engine to idle and then resuming full operational speed.

The problem associated with spool type trimmer heads is that the line may become tangled within the spool or welded to itself particularly in the instances of extended heavy use. Therefore, particularly in the commercial lawn services, there is a trend toward using trimmer heads which utilize fixed line segments which are simply discarded when worn and replaced with a new line segment. While this results in a smaller percentage of the line being actually used, the tangling problems are eliminated and heavier line gauges may be utilized. Heavier line gauges extend the interval of time between line replacements.

A variety of fixed line trimmer heads have been developed. Some utilize line segments which have an enlarged head formed thereon to retain the line to the trimmer head. Others use uniform cross-section segments of line that may be severed from a large spool. Uniform cross-section line enables the replacement line to be easily obtained from convenient low cost sources. Problems, however, occur in simply and securely attaching the uniform cross-section line segment to the trimmer head.

SUMMARY OF THE INVENTION

The object of the present invention is to provide a fixed line trimmer head which can simply and securely retain a length of constant cross-section line while in use.

Another object of the present invention is to provide a fixed line trimmer head which is simple to manufacture, low cost and sufficiently durable to withstand the rigors of use on a commercial lawn care environment.

Accordingly, a line trimmer head assembly is provided having a central hub adapted to be attached to the drive spindle of the line trimmer mechanism and a disc portion extending circumferentially outward from the hub to removably receive a length of uniform cross-section line. The disc member is provided with a pair of circumferentially spaced apart openings on the disc periphery through which the fixed length of line is threaded. The interior portion of the disc is provided with at least two retainer clips having a hook shaped member with an incline ramp surface for cooperating with the portion of the line extending between the two openings. Tension in the line causes the line to ride down the ramp surface and bind in place. The ramp surface is securely locking the line in place and capable of accommodating a wide variety of line diameters.

BRIEF DESCRIPTION OF THE DRAWINGS

FIG. 1 is a perspective view of the first embodiment of the trimmer head utilizing a single length of line having two free ends;

FIG. 2 is a bottom plan view of trimmer head of FIG. 1;

FIG. 3 is a cross-sectional side elevational view taken along line 3—3 of FIG. 2;

FIG. 4 is a partial cross-sectional side elevational view taken along line 4—4 of FIG. 2;

FIG. 5 is a perspective view of an alternative trimmer head embodiment employing two lengths of line having four free ends;

FIG. 6 is a bottom plan view of the alternative trimmer head embodiment shown in FIG. 5;

FIG. 7 is a cross-sectional side elevational view taken along line 7—7 of FIG. 6;

BEST MODE FOR CARRYING OUT THE INVENTION

Figure 8:
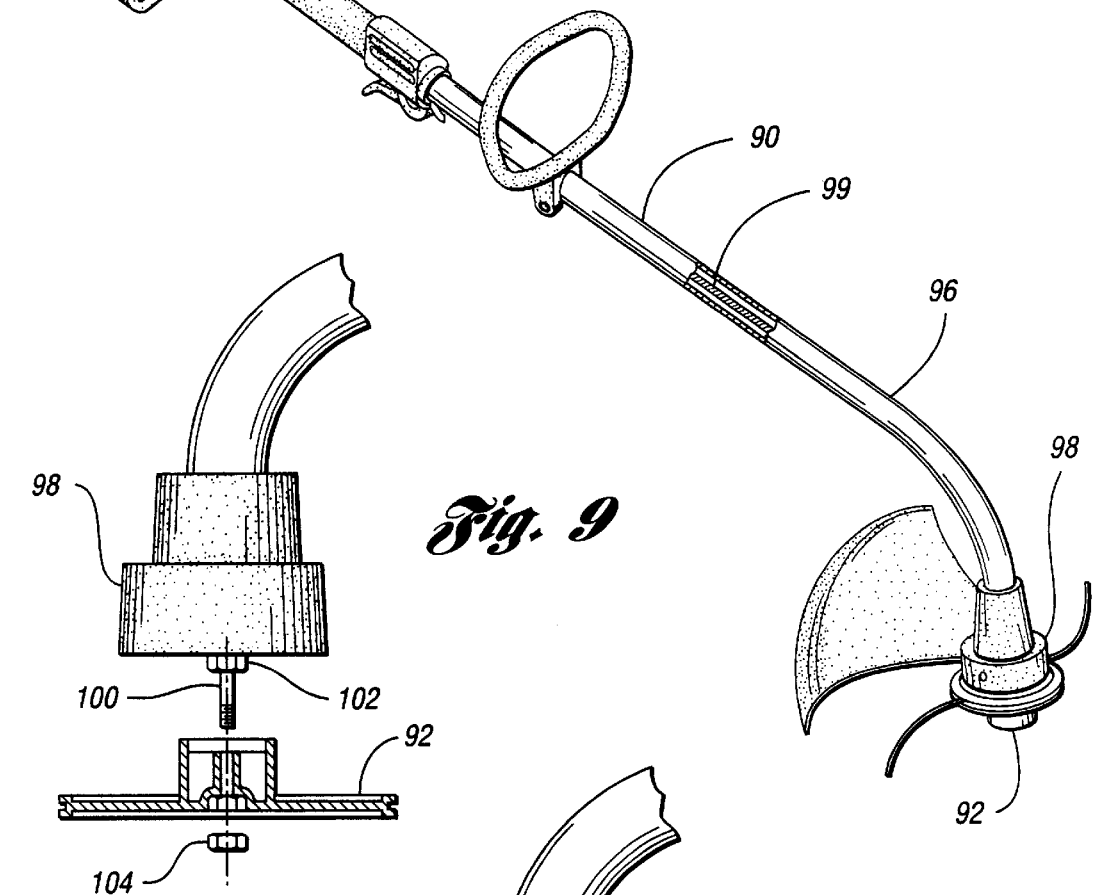
FIG. 8 is a line trimmer incorporating a trimmer head of the present invention.

FIGS. 1–4 illustrate an first embodiment of the invention of line trimmer head 10. Line trimmer head 10 has two main components; a central hub 12 and a body 14. In the preferred embodiment illustrated, body 14 is made up of an annular disc 16 extending circumferentially radially outward from the central hub 12 in a plane generally perpendicular to the central axis 18. Disc 16 has an outer peripheral rim 20 which is preferably a heavier cross-section than the central disc portion 16 in order to provide durability and to maximize the moment of inertia of the line trimmer head. The peripheral rim 20 is provided with a pair of circumferentially spaced apart openings 22 and 24 through which line 26 is threaded. Line 26, when threaded through openings 22 and 24 has two free ends, 28 and 30, which extend generally radially outward from the trimmer head generally radially to central axis 18. A pair of arcuate guides 27 and 27' and 29 and 29' are formed on annular disc 16 adjacent opening 22 and 24 respectively, to prevent the line segment from being bent sharply and damaged.

In order to retain line 26 securely in place, at least two retainers 32 and 34 are provided on disc 16. Retainers 32 and 34 are best illustrated in FIG. 4 cross-section and have a hook shape portion 36 having an incline ramp 38 for engaging line 26. The ramp 38 is inclined relative to disc 16 such that tension in line 26 causes the line to ride down the incline surface and be pinched between ramp 38 and disc 16.

In the preferred embodiment, an aperture 40 is formed in disc 16 immediately adjacent ramp 38 to enable a line to deflect out of the plane of the disc to securely retain the line in place.

As illustrated in FIG. 2, as the line wraps around retainer 32, the line bends at an angle a relative to a line end 28 extending radially from central axis 18. Centrifugal force on the line end 28 pulls the line securely against ramp surface 38 formed on the underside of member 36. Preferably a falls within the range of 30° to 60°.

In the preferred embodiment illustrated, a central retainer 42 is provided for grasping the line intermediate retainers 32 and 34. Central retainer 42 is of the general configuration of retainer 32 and 34 having a generally hook shaped and a lower ramp surface 38 as illustrated in FIG. 4. The ramp surface of central retainer 42 is oriented so that the tension in line causes the line to wedge between the central retainer 42 and disc 16. Central retainer 42 is located at an angle generally midway between retainers 32 and 34 and spaced from central axis 18 sufficiently so that lines drawn from the central retainer 42 to retainers 32 and 34 form an angle B which is between 90° and 150° and most preferably, between 100° and 135°. A greater angle would unnecessarily reduce the hub diameter and reduce the force of the line on the retainer. Too great of an angle will unnecessarily increase the length of line.

Figure 9:
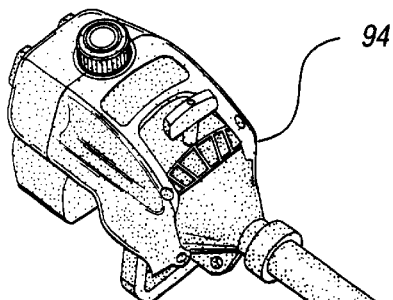
FIG. 9 is an exploded side elevational view of one orientation of the trimmer head and the line trimmer drive spindle.
Figure 10:
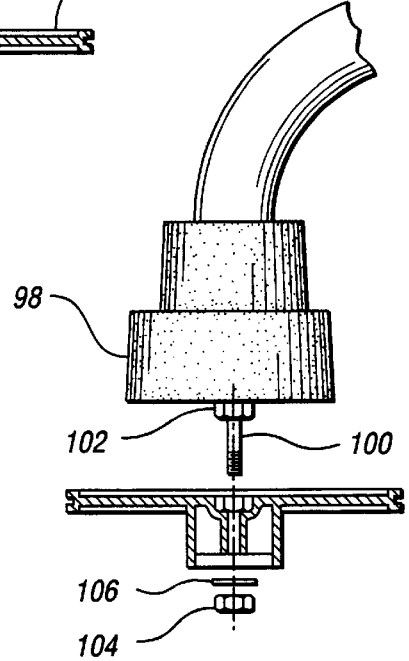
FIG. 10 is an exploded side elevation showing an alternative orientation of a trimmer head and the line trimmer drive spindle.

As illustrated in FIG. 3, central hub 12 is provided with a central bore 44 sized to fit upon a drive spindle of a line trimmer (FIG. 8 and 10). Central bore 44 preferably is provided with an hexagonal shaped recess 46 at the upper end of bore 44 to mate with a corresponding hexagonal shape head on the drive spindle so as to prevent relative rotation in use. The line trimmer head 10 will be affixed to the drive spindle using a conventional nut or the like mounted on the end of the drive spindle trapping the trimmer head between the hexagonal head on the drive spindle and the nut. As illustrated in FIGS. 9–10, the line trimmer head 10 may be affixed to the line trimmer in two alternative orientations with the hub down in FIG. 10 or with the hub up as in FIG. 9.

FIGS. 5–7 illustrate a second trimmer head embodiment 50. Trimmer head embodiment 50 functions similar to the trimmer head embodiment 10 as described previously. However, two line lengths, 52 and 54 are utilized having four free ends 56, 58, 60 and 62 oriented approximately 90° from one another and extending radially outward from trimmer head central axis 64. Trimmer head 50 is provided with a central hub 66, a body member 68. Like trimmer head 10, body member 68 is provided with annular circular disc portion 70 lying in a plane generally perpendicular to that central axis 64 and terminating in a peripheral rim 72. Rim 72 is provided with four circumferentially spaced apart openings 74, 76, 78 and 80. Line 52 threads through openings 76 and 74 as shown enabling line ends 56 and 58 to extend generally radially outward therefrom. Similarly line 54 threads through openings 78 and 80 enabling line ends 60 and 62 to extend radially outward therefrom.

Radially inboard and generally adjacent each of the opening 74, 76, 78, and 80 are a series of retainers 82, 84, 86 and 88, respectively. The representative retainer 88 is shown in cross-section FIG. 4. Retainer 88 forms a generally hook-shaped ramp surface 90 spaced above the planar disc 70 having an incline ramp surface 92 for engaging line 54. Preferably, an aperture 94 is formed in disc 70 immediately above ramp surface 90 so that tensile load on line 54 causes the line to ride down ramp surface 92 and deflects slightly into aperture 94. As shown in FIG. 6, aperture 94 is somewhat larger than hook shape member 90 in plan view so that shear can be maintained at an acceptable level.

Trimmer head 50 is further provided with a pair of central retainers 96 and 98 located generally intermediate retainers 82 and 84 and 86 and 88 respectively. Such retainers 96 and 98 cause the line to form a generally serpentine path. line bends at an angle Θ when wrapping about central retainers 96 and 98. Angle Θ falls within the range of 90° and 150° and preferably, between 100° and 135°. The line as it bends about retainers 82, 84, 86 and 88 preferably form an angle which is not less than 90° in order to minimize internal stress in the line segment.

Central hub 66 is provided with a central bore and a hexagonal recess pocket similar to that described with reference to the hedge trimmer 10 shown in FIG. 3 and 8 and described previously.

FIG. 8 illustrates a line trimmer 90 utilizing a line trimmer head 92 of the present invention. Line trimmer head 92 can be either the single line segment or the dual line segment design shown in FIGS. 2 and 6 respectively. Line trimmer 90 is made up of a motor 94 which can be either a 2 or 4 cycle gasoline engine or an electric motor. Tubular elongated shaft 96 extends between the motor 94 and a bearing housing 98 which pivotally supports a drive spindle 100 adapted to carry line trimmer head 92.

In the preferred embodiment illustrated, a drive shaft 99 extends between the output of motor 94 and operatively connecting motor 94 to the drive spindle 100.

As previously mentioned, the trimmer head may be affixed to the line trimmer drive spindle in two alternative orientation. The central hub up orientation as shown in FIG. 9 and the central hub down orientation as shown in FIG. 10. When installing the trimmer head and the central hub up orientation, drive spindle 100 is telescopically inserted into the central bore of line trimmer head 92. Nut 104 is inserted within the hexagonal socket in the end of the central bore and the line trimmer head and nut are collectively threaded upon the threaded end of spindle 100 until the line trimmer head securely abuts a large hexagonal portion 102 of drive spindle 100.

If the line trimmer operator wishes to install a trimmer head in the hub down orientation as shown in FIG. 10, the line trimmer head will be telescopically inserted over drive spindle 100 until the enlarged hexagonal portion of shaft 102 of shaft 100 is received within the hexagonal recess and the central bore of trimmer head 92, whereupon a nut 104 and associated washer 106 are installed upon the free threaded end of spindle 100 and the nut tightened appropriately. Which orientation would be utilized for the trimmer head is a matter of design choice. By installing the central up, the annular disc may be located closer to the ground, however the disc may be susceptible to contact with obstructions. By installing the central hub in the down orientation as shown in FIG. 10, the central hub serves to space the annular disc off the ground and to prevent inadvertent damage to the disc from contact with rocks or the like on the ground surface.

Trimmer heads 10 and 50 are preferably formed of aluminum die castings resulting in a very durable and relatively low cost structure. Of course, a design of this type can alternatively be made of injected molded plastic using a number of structural plastics commercially available, preferably a glass filled engineered plastic which can withstand shock load and is relatively abrasion resistant.

It is also understood, of course, that while the form of the invention herein shown and described constitutes a preferred embodiment of the invention, it is not intended to illustrate all possible forms thereof. It should also be understood that the words used in the specification are words of description rather than limitation and various changes may be made without departing from the spirit and scope of the invention.

What is claimed is:

1. A line trimmer head for cutting vegetation comprising:
   a central hub having a bore formed thereon aligned along a central axis;
   a body including an annular disc extending circumferentially radially outward from tie central hub in a plane generally perpendicular to the central axis, the disc having a generally uniform thickness outer peripheral rim having a smooth uninterrupted upper and lower outer peripheral edges which extend about the entire 360° periphery of the desk and at least one pair of circumferential spaced apart closed tubular openings extending through the peripheral rim between the upper and lower outer peripheral edges for receiving a length of line which is radially threaded therethrough with each of closed tubular openings being aligned generally radially to the central longitudinal axis; and at least one pair of retainers oriented on the disc for retaining the line in place, each retainer having a hook shape portion having an incline ramp formed on the underside of the hook shape portion for engaging the line securely against the ramp as a result of tension in the line caused by centrifugal force as the head is rotated about the central longitudinal axis.

2. The line trimmer head of claim 1, wherein the outer peripheral rim has a relatively thick uniform thickness and a heavier cross-section than the disc in order to provide durability and to maximize the moment of inertia of the line trimmer head.

3. The line trimmer head of claim 1, wherein the incline ramp is inclined relative to the plane of the disc such that the tension in the line causes the line to ride down the incline surface and be pinched between the ramp and the disc.

4. The line trimmer head of claim 3, further comprising an aperture formed in the disc immediately adjacent the ramp to enable the line to deflect out of the plane of the disc to securely retain the line in place.

5. 5. The line trimmer head of claim 1, wherein as the line wraps around the one of the retainers, the line bends at an angle a relative to the proximate line end extending radially from the central axis.

6. The line trimmer head of claim 5, wherein the angle α is between 30 and 60 degrees.

7. The line trimmer head of claim 1, further comprising a central retainer for grasping the line intermediate one pair of retainers causing the line to form a generally serpentine path.

8. The line trimmer of claim 7, wherein the central retainer comprises a hook shape portion having an incline ramp formed on the underside of the hook shape portion, the ramp oriented so that the tension in the line causes the line to wedge between the central retainer and the disc.

9. The line trimmer of claim 7, wherein the central retainer is located generally midway between the at least one pair of retainers and spaced from the central axis sufficiently so that the line drawn from the central retainer to the at least one pair of retainers forms an angle β.

10. The line trimmer of claim 9, wherein the angle β is between 100 and 135 degrees.

11. The line trimmer of claim 1, wherein the central hub is provided with a central bore having an upper end and sized to fit upon a drive spindle of a line trimmer.

12. The line trimmer of claim 11, wherein the central bore is provided with a hexagonal shaped recess at the upper end of the bore to mate with a corresponding hexagonal shaped head of the drive spindle so as to prevent relative rotation in use.

13. A line trimmer head for cutting vegetation comprising:
a central hub;
a body including an annular disc extending circumferentially radially outward from the central hub in a plane generally perpendicular to a central longitudinal axis, the disc having a relatively thick outer peripheral rim of generally uniform thickness having a smooth uninterrupted upper and lower outer peripheral edges a first and second pair of circumferentially spaced apart closed tubular openings extending through the peripheral rim between the upper and lower outer peripheral edges, a first segment of line having two free ends and threaded through the first pair of closed tubular openings enabling the line ends to extend radially outward therefrom, a second segment of line, having two free ends, and threaded through the second pair of closed tubular openings enabling the line ends to extend radially outward therefrom, and a series of retainers positioned radially inward and generally adjacent each closed tubular opening, each retainer having a generally hook shaped ramp surface spaced above the disc and having an incline ramp for engaging the line.

14. The line trimmer head of claim 13, wherein the ends of the first and second segments of line are oriented approximately 90 degrees from one another and extending radially outward from the central axis.

15. The line trimmer head of claim 13, further comprising an aperture formed on the disc immediately above the hook shaped ramp surface so that a tensile load on the segment of line causes the line to ride down the incline ramp surface and deflect slightly into the aperture.

16. The line trimmer head of claim 15, wherein the aperture is larger than the hook shape ramp surface so that shear load exerted on the segment of line can be maintained at an acceptable level.

17. The line trimmer of claim 13, further comprising a pair of central retainers and located generally intermediate the two pairs of retainers causing the segment of line to form a generally serpentine path.

18. The line trimmer head of claim 17, wherein the segment of line bends at an angle β when wrapping about the central retainers and bends at an angle α when wrapping around the two pairs of retainers wherein the angle β is between 100 and 135 degrees and the angle α is not more than 90 degrees.

19. The line trimmer head of claim 13, wherein the central hub is provided with a central bore having a hexagonal recess and sized to receive a drive spindle of a line trimmer and associated hexagonal fastener.

20. A line trimmer for cutting vegetation comprising:
a motor;
a bearing housing having a body and a rotary drive spindle pivotally connected to the body;
a tubular boom extending between the motor and the bearing housing;
an elongated drive shaft extending through the tubular boom to operatively connect the motor to the drive spindle;
a lawn trimmer head mounted amount the drive spindle for rotation therewith the line trimmer head having:
a central hub having a bore formed thereon aligned along a central axis for telescopically receiving the bore of the central hub;
a body including an annular disc extending circumferentially radially outward from the central hub in a plane generally perpendicular to the central axis, the disc having a generally uniform thickness outer peripheral rim having a smooth uninterrupted upper and lower outer peripheral edges and at least one pair of circumferentially spaced apart closed tubular openings for receiving a length of line which is threaded therethrough, the at least one pair of closed tubular openings aligned generally radially to the central longitudinal axis; and at least one pair of retainers oriented on the disc for retaining the line in place, each retainer having a hook shape portion having an incline ramp formed on the underside of the hook shape portion for wedging the line securely against the disc as a result of tension in the line caused by a centrifugal force as the head is rotated about the central longitudinal axis.

* * * * *

UNITED STATES PATENT AND TRADEMARK OFFICE
CERTIFICATE OF CORRECTION

PATENT NO. : 6,108,914
DATED : August 29, 2000
INVENTOR(S) : John D. Sheldon

It is certified that error appears in the above-identified patent and that said Letters Patent is hereby corrected as shown below:

Column 4,
Line 65, claim 1, delete "tie" and insert -- the --.

Column 5,
Line 31, claim 5, delete "a" and insert -- $\alpha$ --.
Line 47, claim 10, after "$\beta$" insert -- -- (space).

Signed and Sealed this

Eighteenth Day of September, 2001

Attest:

NICHOLAS P. GODICI
Attesting Officer   Acting Director of the United States Patent and Trademark Office